(12) United States Patent
Knuuttila et al.

(10) Patent No.: US 9,024,095 B2
(45) Date of Patent: May 5, 2015

(54) METHOD AND APPARATUS FOR PREPARING FUEL COMPONENTS FROM CRUDE TALL OIL

(75) Inventors: Pekka Knuuttila, Porvoo (FI); Petri Kukkonen, Helsinki (FI); Ulf Hotanen, Lappeenranta (FI)

(73) Assignee: UPM-Kymmene Corporation, Helsinki (FI)

( * ) Notice: Subject to any disclaimer, the term of this patent is extended or adjusted under 35 U.S.C. 154(b) by 919 days.

(21) Appl. No.: 13/203,832

(22) PCT Filed: Feb. 26, 2010

(86) PCT No.: PCT/FI2010/050156
§ 371 (c)(1),
(2), (4) Date: Nov. 21, 2011

(87) PCT Pub. No.: WO2010/097519
PCT Pub. Date: Sep. 2, 2010

(65) Prior Publication Data
US 2012/0088943 A1    Apr. 12, 2012

(30) Foreign Application Priority Data

Feb. 27, 2009 (FI) ................................... 20095198

(51) Int. Cl.
*C07C 1/00* (2006.01)
*C10G 45/58* (2006.01)
(Continued)

(52) U.S. Cl.
CPC .......... *C10G 3/46* (2013.01); *C10G 2300/1048* (2013.01); *C10G 2300/1011* (2013.01);
(Continued)

(58) Field of Classification Search
CPC .......... C10G 3/42; C10G 45/00; C10G 45/58; C10G 2300/1011; C10G 2300/1048; C10G 2300/1055; C10G 2300/20
USPC ................ 585/240, 242; 554/8; 422/618, 634
See application file for complete search history.

(56) References Cited

U.S. PATENT DOCUMENTS 5,705,722 A * 1/1998 Monnier et al. ............... 585/240
7,754,931 B2 * 7/2010 Monnier et al. ............... 585/240
(Continued)

FOREIGN PATENT DOCUMENTS

EP    1201737 B1    5/2002
EP    1396531 A2    3/2004
(Continued)

OTHER PUBLICATIONS

PCT/ISA/210—International Search Report—Nov. 5, 2010.
(Continued)

*Primary Examiner* — Nina Bhat
(74) *Attorney, Agent, or Firm* — Venable LLP; Eric J. Franklin

(57) ABSTRACT

A method for preparing fuel components from crude tall oil. Feedstock containing tall oil including unsaturated fatty acids is introduced to a catalytic hydrodeoxygenation to convert unsaturated fatty acids, rosin acids and sterols to fuel components. Crude tall oil is purified in a purification by washing the crude tall oil with washing liquid and separating the purified crude tall oil from the washing liquid. The purified crude tall oil is introduced directly to the catalytic hydrodeoxygenation as a purified crude tall oil feedstock. An additional feedstock may be supplied to the catalytic hydrodeoxygenation.

22 Claims, 2 Drawing Sheets

(51) Int. Cl.
*C10G 3/00* (2006.01)
*C10G 65/14* (2006.01)
*C10G 69/02* (2006.01)
*C10G 45/00* (2006.01)

(52) U.S. Cl.
CPC .............. *C10G45/00* (2013.01); *C10G 45/58* (2013.01); *C10G 65/14* (2013.01); *C10G 69/02* (2013.01); *C10G 3/50* (2013.01); *C10G 3/60* (2013.01); *C10G 2300/1014* (2013.01); *C10G 2300/1022* (2013.01); *C10G 2400/04* (2013.01); *C10G 2300/201* (2013.01); *C10G 2300/805* (2013.01)

(56) References Cited

U.S. PATENT DOCUMENTS

| | | | |
|---|---|---|---|
| 7,888,542 B2* | 2/2011 | Koivusalmi et al. | 585/327 |
| 8,471,081 B2* | 6/2013 | McCall | 585/240 |
| 2006/0264684 A1* | 11/2006 | Petri et al. | 585/250 |
| 2008/0154073 A1* | 6/2008 | Petri et al. | 585/240 |
| 2008/0161614 A1* | 7/2008 | Bertoncini et al. | 585/240 |
| 2009/0124839 A1* | 5/2009 | Dumesic et al. | 585/251 |

FOREIGN PATENT DOCUMENTS

| | | |
|---|---|---|
| EP | 1728844 A1 | 12/2006 |
| EP | 1741768 A1 | 1/2007 |
| WO | WO-2008/058664 A1 | 5/2008 |
| WO | WO 2008058664 * | 5/2008 |
| WO | WO-2009/039000 A2 | 3/2009 |
| WO | WO 2009131510 * | 10/2009 |

OTHER PUBLICATIONS

PCT/IPEA/409—International Preliminary Report on Patentability—Jun. 14, 2011.

* cited by examiner

US 9,024,095 B2

METHOD AND APPARATUS FOR PREPARING FUEL COMPONENTS FROM CRUDE TALL OIL

FIELD OF THE INVENTION

The present invention relates to a method for preparing fuel components from crude tall oil, which method is of the type set forth in the preamble portion of claim 1. The invention also relates to an apparatus for performing the method, the apparatus being of the type set forth in the preamble portion of claim 15.

BACKGROUND OF THE INVENTION

Raw materials of natural origin are potential sources of various fuels or fuel components. For example, tall oil, a by-product of the kraft pulping of coniferous trees, has been used as raw material for hydrocarbon fuel components. U.S. Pat. No. 5,705,722 describes converting unsaturated fatty acids of tall oil to cetane improvers for diesel fuels. According to this patent, a feedstock consisting of tall oil is fed through a catalytic reactor by contacting it simultaneously with gaseous hydrogen. The resulting product is drawn off the reaction as one product stream which is further fractionated by distillation, from which cetane stream is drawn off as middle distillate.

In the above-mentioned process, depitched tall oil is used as raw material feedstock. According to the document, depitched tall oil is obtained by evaporating crude tall oil, for example by thin-film evaporator, to remove unsaponifiables and ash in the tall oil, which is followed by possible further distillation stages for the fractionation of fatty acids, diterpenic acids etc. The depitching (thermal evaporation) reduces both unsaponifiables and ash in the tall oil. The desired properties of the finished depitched tall oil include light colour, low ash content and high acid number. The depitched tall oil used in the process contains about 5-20 wt % unsaponifiable components. The document mentions also that when making depitched tall oil, ash can be removed by washing the tall oil with water and unsaponifiables can be removed by solvent extraction, solid-phase adsorption or liquid chromatography.

Document EP-1728844 A1 describes a process for producing hydrocarbon fraction useful as diesel fuel from biorenewable feedstocks by pretreating the feedstock to remove contaminants, such as alkali metals, that can poison the downstream catalyst, and then subjecting the pretreated feedstock to catalytic hydrogenation and decarboxylation/hydrodeoxygenation steps. Crude tall oil is mentioned as one example of biorenewable feedstocks, besides many triglyceride-based vegetable oils. The pretreatment step can include either ion-exchange with an acidic ion exchange resin or washing with an acid. In the example submitted later in the files of this document, washing soybean oil with 40% phosphoric acid solution was presented as an example of acid wash.

Document WO-2008/058664 describes a process for producing hydrocarbon fractions, which comprises successive hydrodeoxygenation (HDO) and hydroisomerization steps of feedstock of biological origin, one example among many feasible raw materials being tall oil. Before the HDO step, the feedstock can be subjected to adsorption on a suitable material, ion exchange, or slightly acid washing using sulfuric acid, nitric acid or hydrochloric acid, to remove alkaline metals and earth alkaline metals (Na, K, Ca). Gaseous phase separated after the HDO step and containing hydrogen, water, CO, $CO_2$ light hydrocarbons and possibly small quantities of $H_2S$ is subjected to purification by means of caustic washing or treatment with amines, such as monoethanolamine or diethanolamine, to obtain recyclable gaseous fraction consisting essentially of $H_2$ and traces of CO.

Document EP 1741768 A1 describes a process for producing diesel range hydrocarbons from bio oils and fats comprising hydrotreating the feedstock in a hydrotreating step and isomerising it in an isomerisation step. A pretreatment step, degumming, is recommended for the feedstock, such as crude vegetable oil or animal fat, in order to remove phosphorus compounds, such as phospholipids. Degumming is performed by washing the feed at 90-105° C., 300–500 kPa(a), with $H_3PO_4$, NaOH and soft water and separating the formed gums. A major amount of metal components, which are harmful for the hydrotreatment catalyst, are also removed from the feedstock during the degumming stage. Degumming as described above is a standard procedure for removing phospholipids and metals from vegetable oils of natural origin based on triglycerides and containing significant amounts of gums, typically 0.5-3% by weight. Iron and also other metals may be present in these oils in the form of metal-phosphatide complexes.

Still one process using biological raw materials is described in European patent 1396531, where raw materials containing fatty acids and/or fatty acid esters, including tall oil, are converted to hydrocarbon components in catalytic hydrodeoxygenation and isomerization steps.

Crude tall oil (CTO) is a promising candidate as raw material for manufacturing various fuel components. In the solutions of prior art expensive distillation steps are used to produce tall oil fatty acid fractions from crude tall oil. These fatty acid fractions are then processed e.g. by catalytic HDO (hydrodeoxygenation) and isomerization to desired fuel components while the fuel potential of other fractions left out is lost. Conversion of crude tall oil to fuel components, especially diesel components, involves three basic problems, namely 1) quality of the CTO. CTO comprises impurities, such as residual metals (ash) and phosphorus, which cause poisoning of the catalysts used in the process. Also quality variations of the CTO cause problems in converting CTO to fuel components.

2) quality of the produced diesel product. With prior art methods it is difficult to produce fuel components from CTO that have low $C_p$, (cloud point) and high cetane number. It is also difficult to achieve good yield in these processes.

3) highly exothermic reactions in the catalytic hydrodeoxygenation (HDO) step, which cause deteriorating of the catalyst and shorten the catalyst life. This is often avoided by recirculating the HDO product stream, which causes more problems to the process. The product stream exiting from HDO namely comprises the impurities that the CTO feed had, when it was introduced to the HDO. Consequently, the impurities are enriched to the recirculated HDO product stream and the recirculation will increase the poisoning of the HDO catalyst.

SUMMARY OF THE INVENTION

It is the purpose of the invention to provide a simple yet efficient process for converting tall oil catalytically to useful fuel components. This purpose is attained by a method which is characterized by the features in the characterizing portion of claim 1. The feedstock of the process is crude tall oil which contains fatty acids, rosin acids, unsaponifiables, pitch (neutral compounds, such as sterols), sulphur compounds and impurities discussed above. The proportions of various components can vary depending on the source of tall oil. Crude tall oil feedstock (CTO feedstock in short) is purified in a purification step by washing it with washing liquid, and purified crude tall oil is separated from the washing liquid, whereafter the purified crude tall oil from the purification step is introduced as a purified crude tall oil feedstock to a catalytic HDO step. The purified crude tall oil feedstock is introduced directly, without an intermediate thermal purification step, to the catalytic HDO step. Ring opening of cyclic compounds of the crude tall oil is combined with the catalytic HDO step.

The purification step can be batchwise or continuous. The crude tall oil can be washed with washing liquid in batches, which are left to stand for a sufficient time to allow the washing liquid phase containing the impurities and the purified tall oil phase to settle based on specific gravity differences, and the purified tall oil phase is taken out as purified tall oil feedstock. If necessary, the remaining water can be removed from the purified tall oil phase by centrifugation. A continuous purification step may comprise a washing step where crude tall oil feedstock is continuously mixed with washing liquid, whereafter the mixture is introduced to a continuous separation step from where the washing liquid containing the impurities and the purified tall oil feedstock are continuously drawn off. The continuous separation step may comprise a continuously operating centrifuge, for example a disc centrifuge.

According to one embodiment, the washing liquid is pure water or water containing organic weak acid, complexing agent or adsorbent. Because the phosphorus content of crude tall oil is initially low, no treatment with phosphoric acid which would require neutralization with sodium hydroxide and consequently addition of harmful ions is necessary. The water-based washing liquid and all solid matter can be easily separated using differences in specific gravity, preferably by centrifuge. Because crude tall oil contains large amount of metals in the form of sulphate salts, they are easily removed with the water-based washing liquid.

According to a preferred embodiment, the HDO product stream released from the catalytic HDO is supplied to a separation step, where at least one hydrocarbon fraction is separated from the HDO product stream. According to a particularly preferred embodiment, various fuel components are separated to various product streams in the separation step and only the product stream corresponding to the diesel fraction is led through an isomerizing step.

Still according to preferred embodiments, the heavier fractions separated from the product stream of the catalytic HDO step in the separation step are circulated through a cracking step back to the inlet of the catalytic HDO step.

Still according to one embodiment, the temperature of the catalytic HDO step is controlled by supplying a first additional feedstock to the HDO step. This first additional feedstock is different from the main feedstock (purified crude tall oil feedstock), and its exothermic response is preferably lower than that of tall oil fatty acids. The first additional feedstock is any heat transferring liquid/auxiliary substance, which may also contribute to the production of suitable fuel components. Preferably Fischer-Tropsch (FT) wax from a Biomass-To-Liquid (BTL) process is used as the first additional feedstock but also other substances, for example n-hexadecane can be used. According to another embodiment, a second additional feedstock is supplied to the process. The second additional feedstock is also different from the main feedstock. The second additional feedstock is preferably turpentine, which can be supplied either to the purification step or to the HDO step. The second additional feedstock contributes to the production of suitable fuel components.

The said first additional feedstock and the said second additional feedstock can be supplied as independent alternatives to the process, or they can be supplied simultaneously to the same process.

The apparatus according to the invention comprises a purification section comprising a washing section whose first inlet is connected to source of CTO feedstock and second inlet to source of washing liquid, as well as a first outlet, that is connected to the catalytic HDO reactor for supplying directly the purified crude tall oil to the catalytic HDO step. According to a preferred embodiment, the purification section comprises also a separating section comprising equipment for separating purified crude tall oil from the washing water, for example a centrifuge.

The catalytic HDO reactor contains a catalyst having ring-opening character. The catalyst used in the catalytic HDO reactor as the HDO catalyst can have also ring-opening properties, in which case it can function as a combined HDO and ring-opening catalyst.

By washing the feedstock before it is introduced to the HDO step, CTO impurities which would disturb the following catalytic steps are reduced. The purification step comprises contacting the crude tall oil feedstock with the washing liquid and removing the washing liquid and the impurities from the tall oil in a physical separation step. Examples of impurities removed are inorganic impurities, such as inorganic alkaline metal (Na, K) compounds, sulphur, silicon, phosphorus, calcium and iron compounds. These compounds cause poisoning of the catalysts and they can also be called ash. Heavy polymeric macromolecular compounds that might interfere with the porous structure of the catalyst can also be removed. The separation step, if used subsequently to the washing step, is a physical separation step and it preferably comprises centrifugation. In the physical separation step, water, substances dissolved or dispersed therein from the crude tall oil, possible precipitates and possible solid absorbent are removed with the water phase. Depitching operation and following distillation, as well as degumming followed with drying, which involve use of extensive equipment can be omitted totally. The washing liquid used does not contain added inorganic acids to avoid inorganic anions such as sulphates or phosphates. The pH of the washing liquid may be acidic, in the range of 4-6. For example ion-exchanged water may have an acidic pH because of dissolved carbon dioxide.

Crude tall oil contains small amount phospholipids which on contact with water form micelles which retain part of water, phosphorus and metal ions in the tall oil phase. Organic acids of the washing liquid, such as acetic acid or oxalic acid, break and hydrolyze the metal complexes formed by phospholipids. Thus the metals can be removed with water. The oxalic acid is also an effective calcium ion binder.

By a simple pretreatment process by washing and separation, organic carbon compounds such as fatty acids, rosin acids and sterols, are retained in the purified crude tall oil feedstock as fully as possible and they can be processed further to useful fuel components.

The key step in the process, the catalytic HDO step, is highly exothermic. This exothermicity can be reduced by feeding, in addition to the tall oil feedstock, a first additional feedstock that is less exothermic per carbon atom in the catalytic HDO reaction than the tall oil fatty acids. A suitable first additional feedstock of this type can be a wax containing saturated hydrocarbons. By supplying a such a first additional feedstock to the HDO reactor, the rise of the reaction heating is controlled in the catalyst bed and the catalyst life is improved.

Turpentine, also a byproduct of alkaline Kraft pulping of wood, can also be used as additional feedstock, as a second additional feedstock. Turpentine contains $C_{10}$ hydrocarbons which can be converted to valuable fuel components in the same process as tall oil. It thus increases the amount of produced hydrocarbon components.

BRIEF DESCRIPTION OF THE DRAWINGS

The invention will be described in the following with reference to the enclosed drawings, where.

DETAILED DESCRIPTION OF THE PREFERRED EMBODIMENTS

Figure 1:
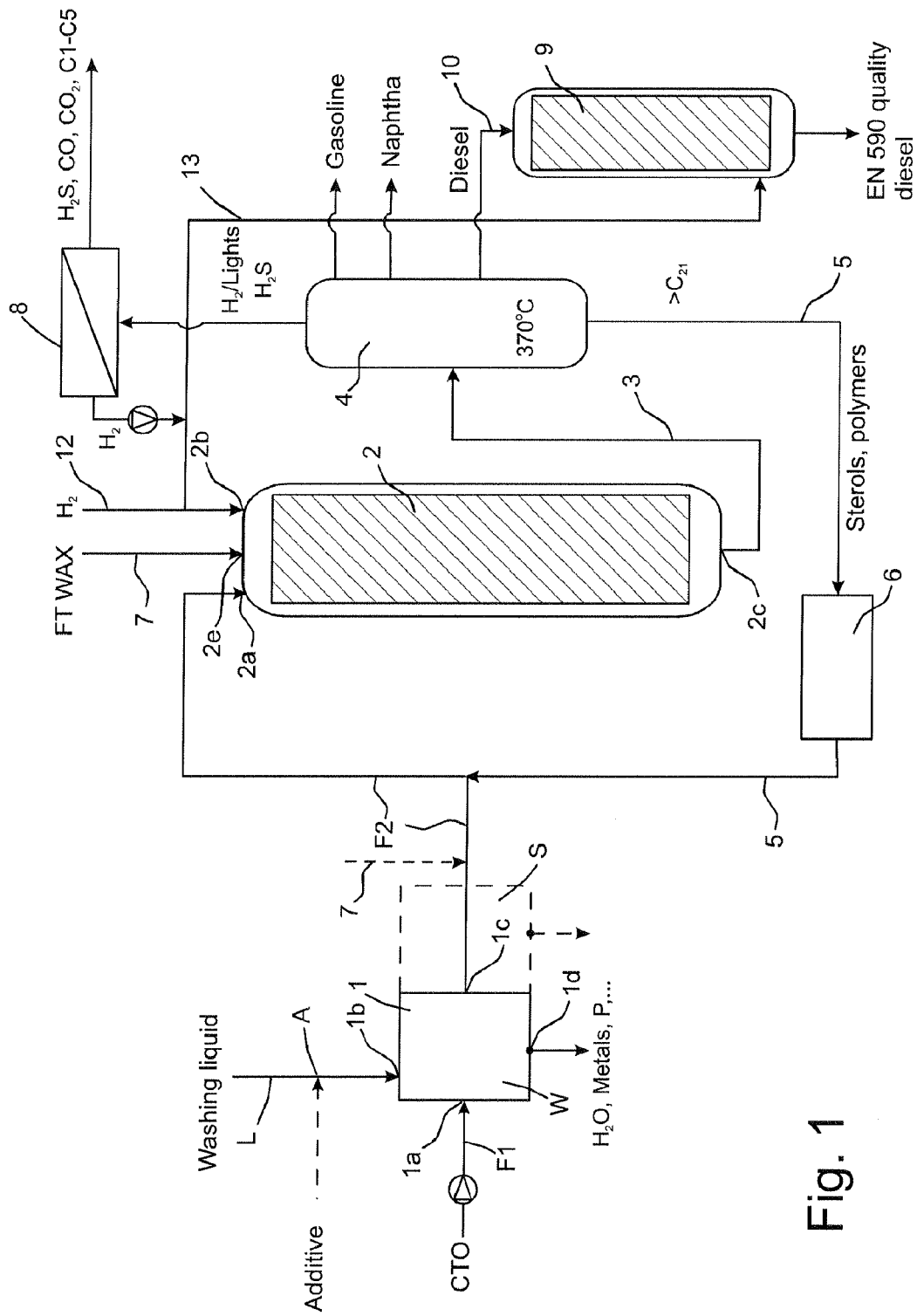
FIG. 1 shows schematically an apparatus which performs the process according to the invention.

In the present specification and claims, the following terms have the meanings defined below.

The term "catalytic HDO" or "catalytic hydrodeoxygenation" refers to a catalytic treatment of the feedstock with hydrogen under catalytic conditions, wherein the following reactions take place: deoxygenation by removal of carboxyl oxygen as water by the means of hydrogen under the influence of catalyst and hydrogenation by saturation of carbon-carbon double bonds by means of hydrogen under the influence of a catalyst. According to a preferred embodiment, the catalytic HDO has also a ring opening character. The preferred HDO of the invention also removes non-desired impurities such as sulphur as hydrogen sulphide and nitrogen as ammonia.

The terms "decarboxylation" and "decarbonylation" refer to removal of carboxyl oxygen as CO2 (decarboxylation) or as CO (decarbonylation) with or without the influence of hydrogen.

The term "isomerization" refers to catalytic and hydrogen assisted introduction of short chain (typically methyl) branches into n-paraffinic hydrocarbons.

The term "cracking" refers to catalytic decomposition of organic hydrocarbon materials using hydrogen.

The term "n-paraffins" refer to normal alkanes or linear alkanes that do not contain side chains.

The term "isoparaffins" mean alkanes having one or more C1-C9, typically C1-C2 alkyl side chains, typically mono-, di-, tri- or tetramethylalkanes The term "FT" or "Fischer Tropsch" refers to a synthesis comprising catalyzed chemical reactions in which hydrogen and carbon monoxide are converted to a substantially Gaussian distribution of hydrocarbon chains of various lengths (designated ($C_1$ to $C_{100+}$)). Typical catalysts used are based on iron and cobalt. The term "Fisher Tropsch wax" refers to a heavy fraction separated after the FT reaction comprising mainly of $C_{21}$ to $C_{100+}$ hydrocarbons.

The term "BTL" refers to Biomass-To-Liquid-process, which is a multi step process to produce liquid biofuels from biomass. The main process used for BTL is the Fisher Tropsch process.

The term "CTO" or "crude tall oil" refers to a byproduct of the Kraft process of wood pulp manufacture. Crude tall oil contains generally both saturated and unsaturated oxygen-containing organic compounds such as rosins, unsaponifiables, sterols, rosin acids (mainly abietic acid and its isomers), fatty acids (mainly linoleic acid, oleic acid and linolenic acid), fatty alcohols, sterols and other alkyl hydrocarbon derivatives, as well as inorganic impurities discussed above (alkaline metal (Na, K) compounds, sulphur, silicon, phosphorus, calcium and iron compounds).

The term "purified crude tall oil" or "purified CTO" refers to crude tall oil from which the impurities have been removed in the purification step. Purified crude tall oil feedstock or purified CTO feedstock is the product of the purification step which is fed to the next process step.

The term "turpentine" refers to a fluid obtained by the distillation of resin obtained from trees, mainly pine trees. It is composed of terpenes, mainly the monoterpenes alpha-pinene and beta-pinene. It is also a byproduct of alkaline Kraft pulping of wood.

The apparatus comprises a catalytic HDO reactor 2, a feedstock inlet 2a connected to the upper part of the reactor 2, a hydrogen inlet 2b connected to the upper part of the reactor 2, and a HDO product stream outlet 2c connected to the lower part of the reactor. Hydrogen conduit 12 for feeding hydrogen gas needed for the catalytic HDO reaction is connected to the hydrogen inlet 2b.

The product stream outlet 2c is connected through a conduit 3 to a flash separator 4 where one or several hydrocarbon fractions containing usable fuel components are separated based on boiling point differences. The residual fraction containing heavier components ($C_{21}$-$C_{100+}$) is taken from the lower part of the separator 4 and circulated through a circulation conduit 5 to a catalytic cracking reactor 6 where the heavier components are cracked to lighter components. The outlet of the cracking reactor 6 is connected to the feedstock inlet 2a of the catalytic HDO reactor, for example to the second feedstock conduit F2 leading to the reactor 2.

The feedstock for catalytic HDO reactor is purified crude tall oil which is obtained from a purification step (to be described later). The purified crude tall oil contains generally both saturated and unsaturated oxygen-containing organic compounds, such as various acids and alcohols which are suitable to be converted to fuel components, as discussed above.

For converting the unsaturated fatty acids in the crude tall oil feedstock to useful aliphatic fuel components, the catalyst in the catalytic HDO reactor 2 section is any suitable HDO catalyst. In case of fatty acids, the HDO involves deoxygenation where, under the effect of hydrogen, oxygen atoms are removed from carboxyl groups as water and replaced with hydrogen, this conversion being called hydrodeoxygenation (HDO). This may be combined with simultaneous decarboxylation and decarbonylation where the carbon of the carboxyl group is also eliminated. The catalyst is preferably sulphur resistant, because the purified tall oil feedstock supplied to the catalytic HDO reactor 2 may contain residual organic sulphur compounds which are not removed in the washing step. As catalyst for these reactions known commercial desulphurization catalysts, for example based on nickel and/or molybdenum, can be used. The catalyst can be a supported NiMo or CoMo catalyst for example on alumina and/or silica support. These catalysts are well known and they are not described in more detail.

In the HDO step, hydrogen is fed in excess of the theoretical hydrogen consumption. The pressure may be between 50 and 100 bar and the temperature between 280° C. and 340° C.

The catalyst used in the catalytic HDO reactor has preferably also ring-opening properties, in which case it can function as a combined HDO and ring-opening catalyst. When the above-mentioned NiMo or CoMo catalysts are used in the HDO step, no ring compounds originally present in the rosin acids of the purified tall oil feedstock or corresponding hydrogenated ring compounds are detected in the product stream.

Consequently, the catalytic HDO reactor 2 is a combined HDO/ring-opening reactor. The native rosin acids have undesirable pour point and cloud point raising effect in diesel fuel, and they have a very poor cetane number. By ring-opening treatment the pour point and cloud point can be lowered and cetane number improved.

Upstream of the reactor 2, the apparatus comprises a purification section 1 for purification of the crude tall oil. The purification section comprises a washing section W for contacting the crude tall oil with the washing liquid, and optionally a separating section S (denoted with broken lines) for separating the purified crude tall oil. The washing section W comprises a washer, which may be any suitable equipment for washing the CTO. The washer may comprise mixing equipment for agitating the CTO/washing liquid mixture. Crude tall oil feedstock is fed through a first feedstock conduit F1 and the inlet 1a to the washing section W of the purification section 1 where its is washed with washing liquid which is introduced along the washing liquid conduit L to the purification section 1 through inlet 1b. Optionally an additive, such as organic weak acid, complexing agent or adsorbent to be discussed below can be introduced at point A to the washing liquid conduit L for enchancing the purification effect of the washing liquid.

As the washing liquid pure water or pure water mixed with an additive, such as organic weak acid, complexing agent or adsorbent, is used. The water may be ion exchanged water or any other sufficiently pure water. The weak organic acid can be acetic acid or oxalic acid. Weak organic acids do not bring inorganic anions to the process and they break up the phospholipid micelles mentioned hereinbefore The oxalic acid is also a known calcium binder. The additive may also be a complexing agent for metal ions, for example calcium ions, such as EDTA. One alternative for the additive is a solid absorbent dispersed in the water. As a solid adsorbent, an activated alumina, a highly porous aluminium oxide can be used.

The separation of the purified crude tall oil from the washing liquid can be done in the washing section W, by letting the water phase to separate from the purified crude tall oil. This can be done either in the washer itself or by providing a separate settling tank in the separating section S. Alternatively to or in addition to the settling tank, the separating section S may also comprise a centrifuge for separating the purified crude tall oil from water phase. Thus, the separating section S may comprise a settling tank or a centrifuge or both of them. If the separation of the purified crude tall oil is done in the washer or in the separate settling tank, the remaining water may be removed by centrifugation in the separating section S, if needed. It is also possible to supply the mixture of the washing liquid and tall oil from the washer to the centrifuge where the separation is accomplished. Thus, depending on the purification procedure, it is possible to supply the purified and separated crude tall oil straight from the washing section W or through a separating section S to the catalytic HDO reactor 2.

The purification step can be batchwise or continuous. In batchwise operation the batches of crude tall oil feedstock are washed with suitable amounts of washing liquid in the washer, and the obtained batches are treated according to the alternatives as mentioned above. It is also possible to perform continuous purification by supplying continuously crude tall oil feedstock and washing liquid to the washer in the washing section W and perform a continuous separation in the separation section S, for example by supplying the mixture of washing liquid and crude tall oil to a continuously operating centrifuge which separates the water and impurities to a water phase containing impurities and the purified tall oil to a continuous stream of purified tall oil feedstock. The centrifuge may be of any known type, for example a disc centrifuge.

The purified crude tall oil feedstock leaves the purification section 1 through an outlet 1c, which is connected directly to the catalytic HDO reactor 2 through a second feedstock conduit F2. The water phase containing the impurities separated from the crude tall oil is discharged through outlet 1d. FIG. 1 shows a case where the outlets 1c and 1d are in the washing section W, but they can be in the separation section S if the purified tall oil feedstock and the washing liquid are separated there. There may be an intermediate tank (not shown) between the outlet 1c and the catalytic HDO reactor 2 to level out the fluctuations in the output of the purification section 1 to provide a constant continuous supply of the feedstock to the catalytic HDO reactor 2, especially if the purification step is operated batchwise.

A catalyst that produces the deoxygenation degree that is as complete as possible, preferably of about 100% is preferably used in the HDO reactor 2. Therefore, to control the temperature of the reactor caused by the exothermicity of the catalytic reaction, a first additional feedstock is introduced to the reactor 2 through a conduit 7, which is connected to the reactor 2 through inlet 2e. This first additional feedstock is not converted by the HDO part of the catalyst in an exothermic reaction, but is capable of absorbing extra heat in the reactor 2 and may participate in other reactions of the apparatus, for example in an isomerization reaction. The first additional feedstock is preferably FT (Fischer Tropsch) wax from a BTL (biomass to liquid) process. The FT wax does nor interfere with the HDO reactions but merely acts as solvent enhancing the function of the catalyst and at the same time levels the local temperature differences that might arise due to the HDO reactions. The FT wax is also capable of generating fuel components when flowing through the apparatus, and the heavier fractions of the wax end up to the cracking reactor 6 from the separator 4 together with the components originating in the CTO.

The first additional feedstock can also be n-hexadecane, which does not participate in the catalytic reactions of the HDO step but acts as heat transfer medium and thus has a cooling effect in the similar way as the FT wax. The n-hexadecane is also a known cetane number improver in diesel fuel and it will end up in the diesel fraction. Both n-hexadecane and FT wax can be supplied as the first additional feedstock.

Alternatively, the conduit 7 for the first additional feedstock can be connected to the second feedstock conduit F2 upstream of the inlet 2a and the additional feedstock will enter the catalytic HDO reactor 2 with the purified CTO feedstock. This alternative feed is denoted in FIG. 1 with broken line 7.

Also other materials that can be converted to usable hydrocarbon fractions and do not participate in the exothermic reactions catalyzed by the HDO catalyst can be used as first additional feedstock to control the temperature of the reactor 2.

The ratio of the first additional feedstock to the purified tall oil feedstock can vary, and it can vary within a wide range, for example between 1/10 and 3/1, preferably 1/10-1/1, based on weight OK Alternatively to the additional feedstock or simultaneously with it, large excess of hydrogen can also be used for the temperature control in the catalytic HDO reactor 2. The hydrogen used can be at least partly circulated hydrogen. The excess hydrogen can act as heat transfer medium and its cooling effect can be enhanced by cooling the hydrogen before it is fed to the catalyst.

The HDO product stream is supplied to the separator 4, where various fuel components that have boiling point below 370° C. are separated to various product streams on the basis of their mutual boiling point differences, and some of these can be subjected further to a catalytic isomerizing reaction. The separator is connected through a conduit 10 to an isomerization reactor 9 to feed a fraction of a certain boiling point range to a further isomerization step. In the embodiment presented in FIG. 1, gasoline, naphtha and diesel fractions recovered from the separator 4 are shown as examples of such product streams cotaining different liquid hydrocarbon fractions. Of these fractions, only the diesel fraction, that is, the fraction that is to be used as diesel fuel, obtained is fed through the conduit 10 to the isomerization reactor 9, which contains non-cracking isomerization catalyst capable of converting straight carbon backbones of n-paraffins (linear alkanes) to branched backbones of isoparaffins (branched alkanes). The n-paraffins are isomerized moderately so that the cold flow properties of the diesel fuel will be improved but the cetane number will not decrease too much. The isomerization is also dependent on whether the diesel fuel is for winter use or summer use. By separating the different fractions and isomerizing only the fraction (diesel fraction) that needs isomerization by feeding it through the isomerization reactor 9, huge savings in equipment costs can be accomplished. The heavier fractions with boiling point above 370° C., such as sterolic components and polymers, as a rule hydrocarbons with more that 21 carbon atoms, are circulated from the separator 4 through the circulation conduit 5 to catalytic cracking reactor 6 and back to the catalytic HDO reactor 2.

The isomerization catalyst of the isomerization reactor 9 can contain Pt or Pd and SAPO or ZSM. Examples are Pt/SAPO-11 or Pt/ZSM-23. Hydrogen is supplied to the lower part of the reactor 9 through a conduit 13 branched off the hydrogen conduit 12, and it flows countercurrently to the diesel fraction through the catalyst bed in the reactor. In the isomerization reactor 9, the pressure may be 30-100 bar and the temperature may be 280-400° C.

The catalyst in the cracking reactor 6 has more acid support than the catalyst in the isomerization reactor 9, for example ZSM-5. The metal in the catalyst is Pt. Hydrogen is supplied also to the catalytic cracking reactor 6 (not shown). High temperature is normally used in the cracking reactor 6 to bring about thermal cracking in addition to acid catalyzed cracking induced by the catalyst.

The product stream of the isomerization reactor 9 can be used as diesel fuel or as a diesel fuel component which raises the cetane number and lowers the cloud point of the fuel.

The apparatus also includes a membrane separator 8 for separating hydrogen from other gaseous components contained in the gases discharged from the upper part of the flash separator 4. The hydrogen is circulated back to the hydrogen inlet 2b of the reactor 2. Another alternative for separating the hydrogen from gaseous components is to first wash the gas emitted from the membrane separator 8 with amine, such as MEA (monoethanolamine) or DEA (diethanolamine), to initially remove hydrogen disulfide, and thereafter to separate the hydrogen from gaseous carbon compounds by a hydrogen permeable membrane. This alternative is shown in FIG. 2.

Figure 2:
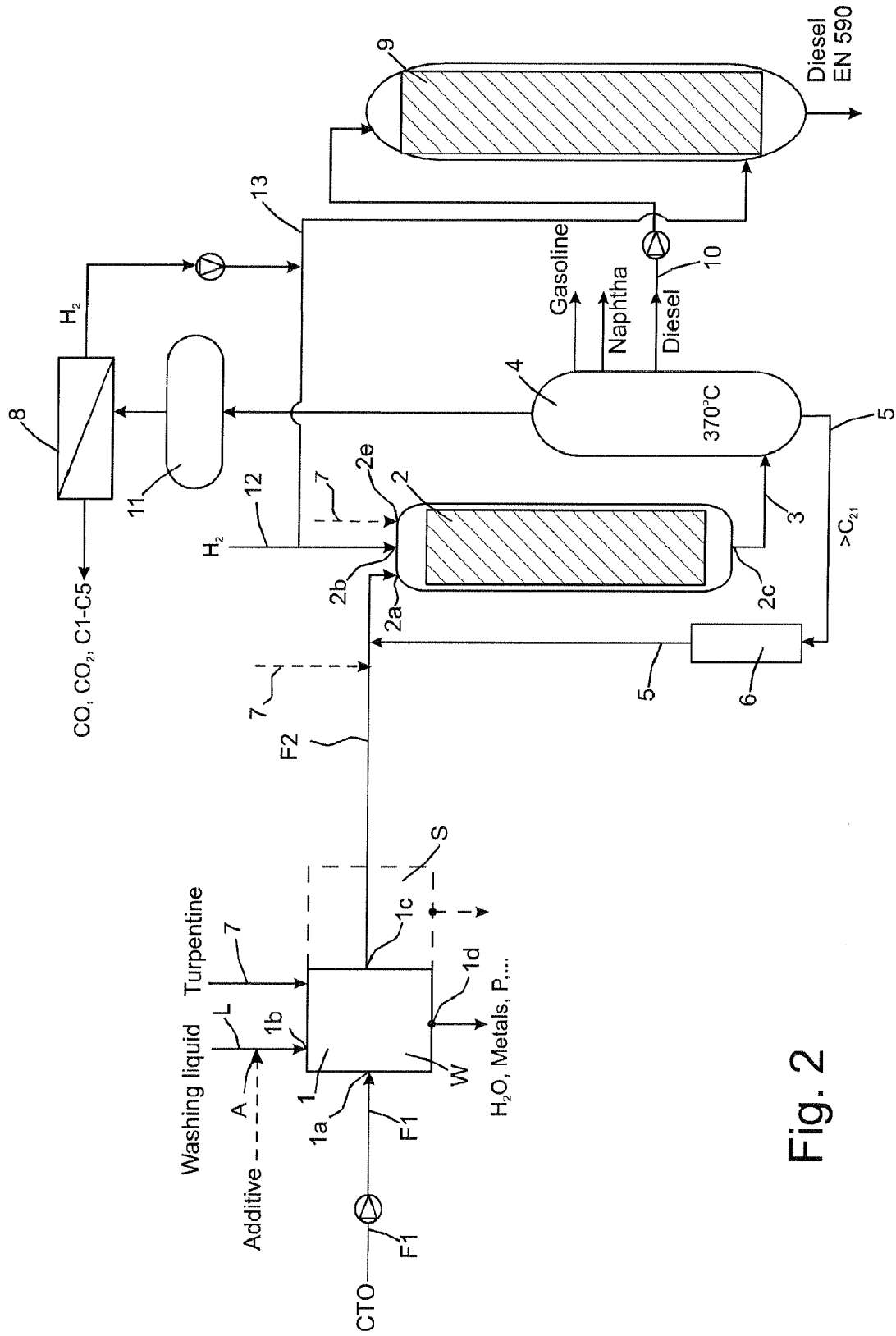
FIG. 2 shows another embodiment of the apparatus.

FIG. 2 shows another alternative where the similar process steps are denoted with similar reference numbers as in FIG. 1. The purification section 1 is similar to that of the embodiment of FIG. 1 and it may have the same alternatives as FIG. 1. The components of the purified tall oil feedstock are converted to gasoline, naphta and diesel fractions in general in the same way as in FIG. 1. In this embodiment, turpentine, another important byproduct of alkaline pulping of wood besides tall oil, is used as a second additional feedstock.

Turpentine is fed though a conduit 7 to the tall oil purification section 1 to the washing section W. In the washing section W, turpentine mixes with the tall oil and it will end up together with the purified crude tall oil feedstock to the HDO reactor 2. Turpentine itself consists essentially of pinenes and carene, which after ring-opening and hydrogenation in the catalytic HDO step produce useful fuel components which are separated in the separator 4 to the gasoline fraction. FIG. 2 also shows how, like in FIG. 1, only the diesel fraction separated in the separator 4 is led through the isomerization reactor 9, while other fuel product fractions (gasoline and naphta) bypass the isomerization step.

The product of the isomerization reactor 9 of both FIG. 1 and FIG. 2 is preferably EN 590 quality diesel.

The gaseous components emitted from the separator 4 are first washed in washer 11 with amine, such as MEA (monoethanolamine) or DEA (diethanolamine), to initially remove hydrogen sulfide, and thereafter the hydrogen is separated from gaseous carbon compounds by a hydrogen permeable membrane in a membrane separator 8. The hydrogen can be used again for the catalytic HDO step. Like in the embodiment of FIG. 1, in the embodiment of FIG. 2, a conduit 13 is branched off the hydrogen conduit 12 to feed hydrogen to the isomerization reactor 9 in order to maintain a sufficient level of hydrogen required by the kinetics of the isomerization reaction.

Turpentine can also be supplied directly to the HDO step or to the second feedstock conduit F2 upstream of the inlet 2a in FIG. 2 in the same way as FT wax in the embodiment of FIG. 1, as denoted by broken lines 7. It is also possible to use the two additional feedstocks simultaneously. Both the turpentine and the FT wax can be supplied to the HDO reactor 2 by feeding them directly to the reactor 2 or to the second feedstock conduit F2, or one of them directly to the reactor 2 and the other to the second feedstock conduit F2 The FT wax can be supplied to the HDO reactor 2, either directly to the reactor 2 or to the second feedstock conduit F2, and the turpentine to the washing section W as in FIGS. 1 and 2, respectively.

The invention is not restricted to the above embodiments, but it can be modified within the scope presented by the claims. The cracking step (reactor 6) is optional, and the heavy fraction from the separator 4 can be circulated through the conduit 5 back to the process without cracking, or it can be taken out of the process as product or waste stream of its own, or as a feedstock stream for a different process. In this case the circulation conduit 5 can be omitted.

The invention claimed is:

1. A method for preparing fuel components from crude tall oil, the method comprising:
   purifying crude tall oil by washing the crude tall oil with washing liquid,
   separating the purified crude tall oil from the washing liquid,
   introducing the purified crude tall oil as a purified crude tall oil feedstock directly to a catalytic hydrodeoxygenation comprising ring-opening of components of the purified tall oil feedstock, to convert unsaturated fatty acids, rosin acids and sterols to fuel components,
   supplying a product stream of the hydrodeoxygenation from the catalytic hydrodeoxygenation to a separation, where various usable fuel components are separated to various liquid hydrocarbon fractions issuing from the separation as various product streams separately from gases discharged from the separation, and leading only a product stream corresponding to a diesel fraction through an isomerizing for producing a hydrocarbon fraction usable as a diesel fuel or a diesel fuel component.

2. The method according to claim 1, wherein the washing liquid is selected from pure water, water with an organic weak acid, water with a complexing agent and water with an adsorbent.

3. The method according to claim 1, wherein the purified crude tall oil is separated from the washing liquid by settling or centrifugation.

4. The method according to claim 1, wherein the purification comprises removing inorganic impurities and heavy macromolecular polymeric compounds from the crude tall oil with the washing liquid.

5. The method according to claim 1, wherein the crude tall oil is purified continuously or batchwise in the purification, from where the purified crude tall oil feedstock is supplied continuously to the catalytic hydrodeoxygenation.

6. The method according to claim 1, wherein a sulphur resistant catalyst is used in the catalytic hydrodeoxygenation.

7. The method according to claim 1, further comprising:
circulating heavier fractions separated in the separation through a cracking to an inlet of the catalytic hydrodeoxygenation.

8. The method according to claim 1, wherein a temperature of the catalytic hydrodeoxygenation is controlled by supplying a first additional feedstock different from the purified crude tall oil feedstock to the catalytic hydrodeoxygenation.

9. The method according to claim 8, wherein the first additional feedstock is Fischer Tropsch wax from a biomass-to-liquid process and/or n-hexadecane.

10. The method according to claim 8, wherein the first additional feedstock is supplied to the catalytic hydrodeoxygenation separately from the purified crude tall oil feedstock, or to the purified crude tall oil feedstock upstream of the catalytic hydrodeoxygenation.

11. The method according to claim 1, further comprising:
supplying a second additional feedstock to the purification, from where the second additional feedstock is introduced together with the purified crude tall oil feedstock to the catalytic hydrodeoxygenation, or a second additional feedstock is supplied straight to the catalytic hydrodeoxygenation through conduit or to the purified crude tall oil feedstock upstream of the catalytic hydrodeoxygenation.

12. The method according to claim 11, wherein the second additional feedstock is turpentine.

13. An apparatus for preparing fuel components from crude tall oil, the apparatus comprising:
a catalytic hydrodeoxygenation reactor,
a feedstock inlet to the catalytic hydrodeoxygenation reactor for introducing crude tall oil to the catalytic hydrodeoxygenation reactor,
a hydrogen inlet to the catalytic hydrodeoxygenation reactor,
an outlet for taking out a hydrodeoxygenation product stream from the catalytic hydrodeoxygenation reactor,
a purification section comprising a washing section comprising first inlet connected through a first feedstock conduit to source of crude tall oil feedstock and a second inlet connected to a source of washing liquid, the purification section further comprising an outlet that is connected to the catalytic hydrodeoxygenation reactor for supplying the purified crude tall oil directly to the catalytic hydrodeoxygenation, which comprises a catalyst having ring-opening properties; and wherein the outlet of the catalytic hydrodeoxygenation reactor is connected to a separator, which is arranged to separate various liquid hydrocarbon fractions from the hydrodeoxygenation product stream of the catalytic hydrodeoxygenation reactor and to discharge gases, the separator being connected through a conduit to a catalytic isomerization reactor, and diesel fraction separated in the separator is arranged to be supplied to a catalytic isomerization reactor through the conduit, whereas conduits for other liquid hydrocarbon fractions separated in the separator bypass the catalytic isomerization reactor.

14. The apparatus according to claim 13, wherein the purification section comprises a separation section for separating purified tall oil from the washing liquid.

15. The apparatus according to claim 14, wherein the separation section comprises a settling tank or a centrifuge.

16. The apparatus according to claim 13, wherein the outlet of the purification section is directly connected to the catalytic hydrodeoxygenation reactor through a second feedstock conduit.

17. The apparatus according to claim 13, wherein the catalyst in the catalytic hydrodeoxygenation reactor is sulphur resistant.

18. The apparatus according to claim 13, wherein the separator is connected through a circulation conduit and a cracking reactor to the inlet of the catalytic hydrodeoxygenation reactor for circulating heavier fractions separated in the separator back to the catalytic hydrodeoxygenation reactor.

19. The apparatus according to claim 13, further comprising:
a conduit connecting the catalytic hydrodeoxygenation reactor to source of additional feedstock for introducing the additional feedstock to the catalytic hydrodeoxygenation reactor.

20. The apparatus according to claim 19, wherein the conduit for introducing additional feedstock is connected directly to the catalytic hydrodeoxygenation reactor or to the second feedstock conduit upstream of the catalytic hydrodeoxygenation reactor.

21. The apparatus according to claim 19, wherein the source of additional feedstock is a source of Fischer Tropsch wax, n-hexadecane or turpentine.

22. The apparatus according to claim 21, wherein the conduit for introducing additional feedstock is connected to a source of turpentine and it is connected to the purification section.

* * * * *

UNITED STATES PATENT AND TRADEMARK OFFICE
CERTIFICATE OF CORRECTION

| | | |
|---|---|---|
| PATENT NO. | : 9,024,095 B2 | Page 1 of 1 |
| APPLICATION NO. | : 13/203832 | |
| DATED | : May 5, 2015 | |
| INVENTOR(S) | : Pekka Knuuttila et al. | |

It is certified that error appears in the above-identified patent and that said Letters Patent is hereby corrected as shown below:

In the Specification

Column 1, line 4 after the Title insert the following paragraph:

--CROSS REFERENCE TO RELATED APPLICATIONS

This application claims priority to Finnish patent application 20095198 filed 27 February 2009 and is the national phase under 35 U.S.C. § 371 of PCT/FI2010/050156 filed 26 February 2010.--

Column 1, under "FIELD OF THE INVENTION", please amend lines 7-12 as follows:

The present invention relates to a method for preparing fuel components from crude tall oil. The invention also relates to an apparatus for performing the method.

Column 2, under "SUMMARY OF THE INVENTION", please amend lines 59-67 and Column 3, lines 1-26 as follows:

It is the purpose of the invention to provide a simple yet efficient process for converting tall oil catalytically to useful fuel components. The feedstock of the process is crude tall oil which contains fatty acids, rosin acids, unsaponifiables, pitch (neutral compounds, such as sterols), sulphur compounds and impurities discussed above. The proportions of various components can vary depending on the source of tall oil. Crude tall oil feedstock (CTO feedstock in short) is purified in a purification step by washing it with washing liquid, and purified crude tall oil is separated from the washing liquid, whereafter the purified crude tall oil from the purification step is introduced as a purified crude tall oil feedstock to a catalytic HDO step. The purified crude tall oil feedstock is introduced directly, without an intermediate thermal purification step, to the catalytic HDO step. Ring opening of cyclic compounds of the crude tall oil is combined with the catalytic HDO step.

Signed and Sealed this
Twenty-fifth Day of August, 2015

Michelle K. Lee
*Director of the United States Patent and Trademark Office*